(12) United States Patent
Shen

(10) Patent No.: US 8,336,433 B2
(45) Date of Patent: Dec. 25, 2012

(54) ROTARY SHEAR

(75) Inventor: William X. Shen, Boylston, MA (US)

(73) Assignee: Siemens Industry, Inc., Apharetta, GA (US)

( * ) Notice: Subject to any disclaimer, the term of this patent is extended or adjusted under 35 U.S.C. 154(b) by 697 days.

(21) Appl. No.: 12/506,682

(22) Filed: Jul. 21, 2009

(65) Prior Publication Data

US 2011/0017038 A1 Jan. 27, 2011

(51) Int. Cl.
*B26D 1/40* (2006.01)
(52) U.S. Cl. .............................. 83/311; 83/345; 83/674
(58) Field of Classification Search .................... 83/303, 83/311, 343–348, 673, 674; 74/412, 413, 74/414, 412 R, 457, 665 L, 665 G, 665 GA
See application file for complete search history.

(56) References Cited

U.S. PATENT DOCUMENTS

| | | | | |
|---|---|---|---|---|
| 1,967,559 A | * | 7/1934 | Schreck | 83/298 |
| 2,272,702 A | * | 2/1942 | Haegele | 83/881 |
| 2,401,639 A | | 6/1946 | Hawthorne | |
| 3,143,910 A | | 8/1964 | Greis | |
| 3,477,326 A | | 11/1969 | Rainey | |
| 3,882,745 A | | 5/1975 | Garrett et al. | |
| 4,062,259 A | | 12/1977 | Sclippa | |
| 4,063,493 A | * | 12/1977 | McEvers et al. | 493/370 |
| 4,090,118 A | | 5/1978 | Smith, Jr. | |
| 4,202,229 A | * | 5/1980 | Feldkamper | 83/304 |
| 4,202,230 A | | 5/1980 | Obinata | |
| 4,319,505 A | | 3/1982 | Otake et al. | |
| 4,399,727 A | | 8/1983 | Omori et al. | |
| 4,406,198 A | | 9/1983 | Pechau et al. | |
| 4,736,660 A | * | 4/1988 | Benach et al. | 83/174 |
| 4,846,033 A | | 7/1989 | Uehlinger et al. | |
| 5,040,440 A | | 8/1991 | Harvey | |
| 5,526,726 A | | 6/1996 | Shore et al. | |
| 5,639,335 A | | 6/1997 | Achilles et al. | |
| 5,644,941 A | | 7/1997 | Stodt et al. | |
| 5,857,370 A | | 1/1999 | Grenz et al. | |
| 6,032,560 A | | 3/2000 | Puchovsky | |
| 6,164,175 A | | 12/2000 | Grenz et al. | |
| 6,349,585 B1 | | 2/2002 | Grenz et al. | |
| 6,745,656 B1 | | 6/2004 | Shen et al. | |
| 2006/0278054 A1 | | 12/2006 | Zhang | |

FOREIGN PATENT DOCUMENTS

| | | |
|---|---|---|
| DE | 2035698 | 1/1972 |
| EP | 0288938 | 11/1988 |
| EP | 0773082 | 12/1999 |
| EP | 1072333 | 9/2003 |
| JP | 52084587 | 7/1977 |
| WO | 03/022471 | 3/2003 |

\* cited by examiner

*Primary Examiner* — Stephen Choi

(57) ABSTRACT

A rotary shear for subdividing a product moving longitudinally along a path comprises a parallel pair of shafts having cutting blades connected thereto. The shafts are on opposite sides of and arranged symmetrically with respect to a center line of the shear. Driven gears on each of the shafts are spaced one from the other. A first pinion gear is in meshed relationship with one of the driven gears, and a second pinion gear in meshed relationship with the other of the driven gears. The first pinion gear has a diameter smaller than the diameter of the second pinion gear. The first and second pinion gears are in an intermeshed relationship at a location spaced laterally from the center line of the shear.

7 Claims, 2 Drawing Sheets

ROTARY SHEAR

BACKGROUND OF THE INVENTION

1. Field of the Invention

This invention relates generally to rotary shears employed to subdivide hot rolled bar products in rolling mills, and is concerned in particular with the provision of an improved and simplified drive for such shears.

2. Description of the Prior Art

Rotary shears are widely employed to subdivide hot rolled bar products ranging from 16 mm rounds traveling at 18 m/s to 60 mm rounds traveling at 2 m/s.

Conventionally, the shears are driven by single ratio gear drives, typical examples of which are illustrated in FIGS. 3A-3D. In each drive arrangement, the gears are arranged symmetrically with respect to the shear center line "CL". Thus, in the drive arrangement shown in FIG. 3A, the upper and lower blade shafts 10 carry gears 12 mechanically coupled by idler gears 14, with the lower blade shaft being directly driven by a coaxial input shaft (not shown).

FIG. 3B discloses a similar symmetrical gear arrangement, the difference being that the lower gear 12 is driven by a pinion 16 on an offset input shaft 18.

With these drive arrangements, the shears are incapable of handling the larger product sizes because the idler gears 14 are too small and weak. The drive arrangement of FIG. 3A is additionally compromised by a low moment of inertia.

In the drive arrangement shown in FIGS. 3C and 3D, the blade shafts 10' carry large diameter intermeshed gears 20. In the drive arrangement illustrated in FIG. 3C, the bottom gear 20 is driven directly by a coaxial input shaft (not shown). If the gears 20 are thin and lightweight, the shear can cut the smaller bars, but the relative fragility of such gears will rule out shearing the larger product sizes. Conversely, if the gears 20 are heavier and more robust, the shear will be incapable of handling smaller bars due to the resulting increase in moment of inertia.

In the arrangement illustrated in FIG. 3D, where the lower gear 20 is again driven by a pinion 16 carried on an offset input shaft 18, increased inertia again precludes shearing the range of smaller bars.

Thus, the shearing of the entire range of bar sizes typically requires the use of at least two shears, one being dedicated to the subdivision of the smaller bars traveling at the higher speeds, and the other being dedicated to the larger bars traveling at the lower speeds, where greater inertia is required.

In a more recent development, as described in US2006/0278054A1, a single rotary shear has a dual ratio gear drive which may be selectively operated to provide a higher cutting speed for the smaller bar products and a lower cutting speed, augmented where necessary by a fly wheel, to provide high inertia for the larger bar products.

The conventional use of multiple shears is disadvantageous in that it increases initial capital investment and subsequent maintenance costs. Although these problems are alleviated to some extent by the use of a single shear capable of subdividing the entire range of bar products, the dual ratio gear drive employed to achieve this broader capability is itself complicated and costly.

The objective of the present invention is to provide a shear capable of handling the entire range of bar products, with a less complicated and expensive single ratio gear drive.

SUMMARY OF THE INVENTION

In accordance with the present invention, a rotary shear for subdividing longitudinally moving products such as hot rolled steel bars comprises a parallel pair of first shafts having cutting blades connected thereto. The first shafts are located on opposite sides of and are arranged symmetrically with respect to the shear center line, which lies in a plane containing the path of product travel. Mutually spaced driven gears are carried on the first shafts. Intermeshed first and second pinion gears are each in meshed relationship with a respective one of the driven gears. The first pinion gear has a diameter smaller than the diameter of the second pinion gear. The pinion gears are arranged asymmetrically with respect to the shear center line, with the first pinion gear being carried on and driven by an input shaft.

Preferably, the driven gears have equal diameters, with the diameter of the first pinion gear being smaller than the diameters of the driven gears.

The diameter of the second pinion gear is preferably larger than the diameters of the driven gears.

Preferably, at least one flywheel is rotatably mounted on the input shaft, with a clutch mechanism serving to selectively fix the flywheel on the input shaft for rotation therewith.

DETAILED DESCRIPTION

Figure 1:
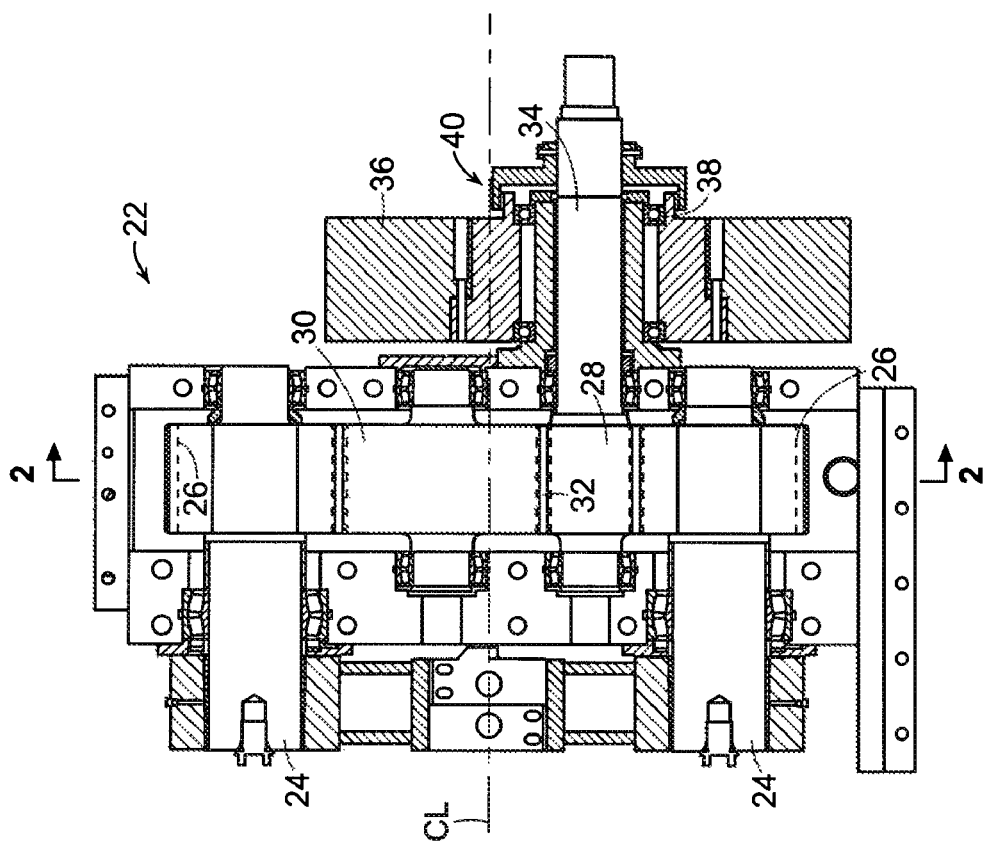
FIG. 1 is a vertical sectional view taken through a shear in accordance with the present invention.
Figure 2:
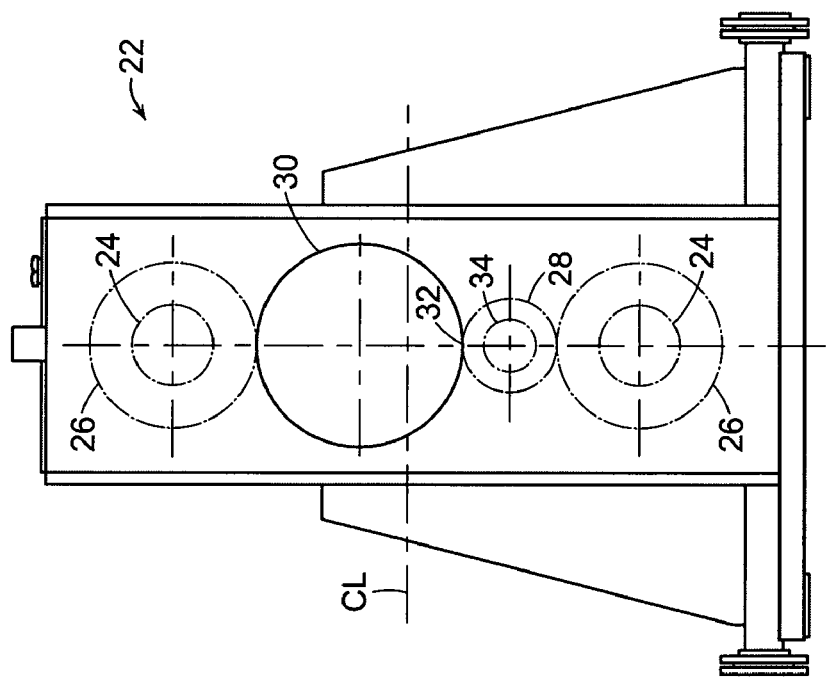
FIG. 2 is cross sectional view on line 2-2 of FIG. 1 diagrammatically depicting the gear drive.
Figure 3D:
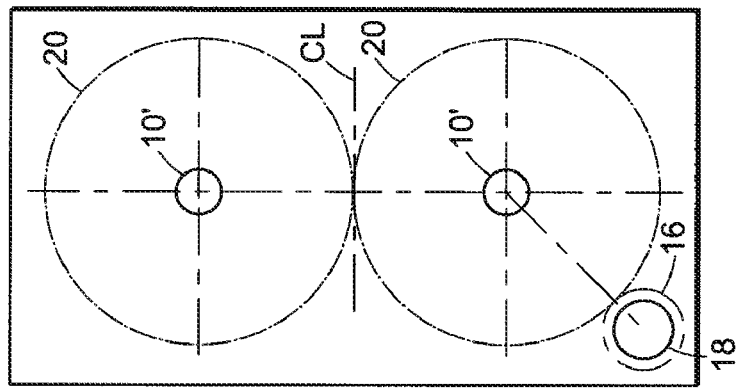
FIGS. 3A-3D are schematic illustrations of conventional single ratio gear drives.
Figure 3C:
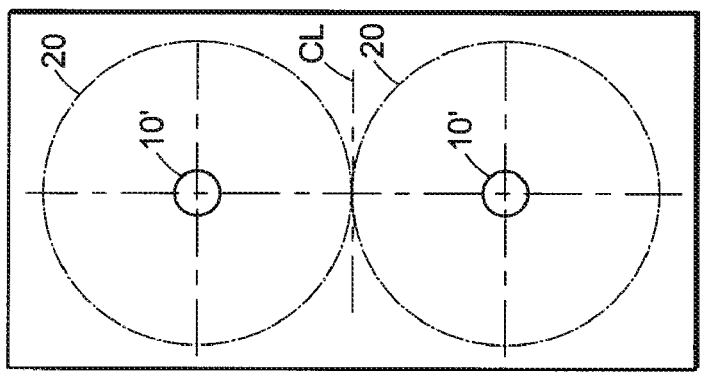
Figure 3B:
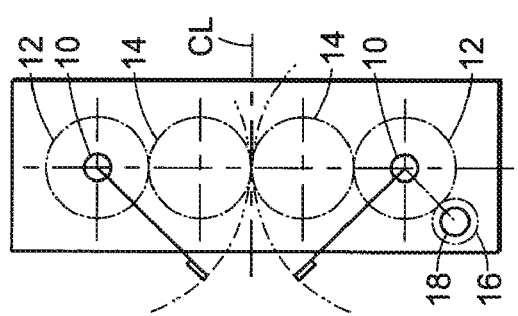
Figure 3A:
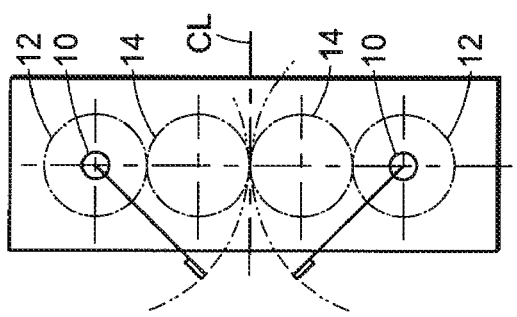

With reference to FIGS. 1 and 2, a shear in accordance with the present invention is generally depicted at 22. The shear comprises a parallel pair of blade carrying shafts 24. The shafts 24 are on the opposite sides of and are arranged symmetrically with respect to the shear center line CL.

Driven gears 26 are carried on the shafts 24 and are spaced one from the other. A first pinion gear 28 is in meshed relationship with the lower driven gear 26, and a second pinion gear 30 is in meshed relationship with the upper driven gear 26. The first pinion gear 28 has a diameter smaller than the diameter of the second pinion gear 30, and the pinion gears 28, 30 are in an intermeshed relationship at a location 32 spaced laterally from and parallel to the shear center line CL.

The first pinion gear 28 is carried on and rotatably driven by an input shaft 34.

The driven gears 26 have equal diameters, with the diameter of the first pinion gear 28 being smaller than that of the driven gears, and with the diameter of the second pinion gear 30 being larger than that of the driven gears. The arrangement of the pinion gears 28, 30 is this asymmetrical with respect to the shear center line CL.

At least one flywheel 36 may be rotatably mounted on the input shaft 34 by suitably positioned bearings 38. A clutch mechanism 40 serves to rotatably fix and engage the flywheel 36 on the shaft 34 when an increase of the shear's moment of inertia is required to shear larger slower moving bars.

The following represents non-limiting examples of gear sizes suitable for the above-described arrangement:

| Gears | Diameter (mm) | (No. of Teeth) |
| --- | --- | --- |
| Driven (26) | 396.80 | 32 |
| First Pinion (28) | 223.20 | 18 |
| Second Pinion (30) | 480.0 | 39 |

The pinion gear ratio (32/18) = 1.78, which when squared $(1.78)^2$ yields an increase of 3.2 times the added moment of inertia provided by the engaged flywheel 36.

With the flywheel 36 disengaged, the shear of the present invention is characterized by a relatively low moment of inertia, thus making it suitable for shearing the smaller range of bar sizes traveling at higher speeds. The pinion gear 30 is large and relatively robust, thus enabling it to withstand the stresses encountered when shearing larger slower moving products, which is made possible by the increased moment of inertia supplied by the engaged flywheel 36 as multiplied by the pinion gear ratio.

I claim:

1. A rotary shear for subdividing a product moving longitudinally along a path, said shear comprising:
    a parallel pair of shafts having cutting blades connected thereto, said shafts being on opposite sides of and arranged symmetrically with respect to a center line of said shear;
    a driven gear on each of said shafts, said driven gears being spaced one from the other;
    a first pinion gear in direct meshed relationship with one of said driven gears, and a second pinion gear in direct meshed relationship with the other of said driven gears, said first pinion gear having a diameter smaller than the diameter of said second pinion gear, with said first and second pinion gears being in an intermeshed relationship at a location spaced laterally from the center line of said shear; and
    drive means for rotatably driving said first pinion gear.

2. The rotary shear of claim 1 wherein said driven gears have equal diameters.

3. The rotary shear of claim 2 wherein said first pinion gear has a diameter smaller than the diameters of said driven gears.

4. The rotary shear of claim 2 or 3 wherein said second pinion gear has a diameter larger than the diameter of said driven gears.

5. The rotary shear of claim 1 wherein said drive means comprises an input shaft, at least one flywheel rotatably mounted on said input shaft, and a dutch mechanism for selectively fixing said flywheel on said input shaft for rotation therewith.

6. A rotary shear for subdividing a product moving longitudinally along a path lying in a plane containing a shear center line, said shear comprising:
    a parallel pair of first shafts having cutting blades connected thereto, said first shafts being on opposite sides of and arranged symmetrically with respect to said shear center line;
    driven gears on each of said first shafts, said driven gears having equal diameters and being spaced one from the other;
    a pair of intermeshed pinion gears of unequal diameter, each pinion gear being in direct meshed relationship with a respective one of said driven gears, said pinion gears being rotatable about axes on opposite sides of and arranged asymmetrically with respect to said shear center line; and
    drive means for rotatable driving the pinion gear having the smaller diameter.

7. A rotary shear for subdividing a product moving longitudinally along a path, said shear comprising:
    a parallel pair of shafts having cutting blades connected thereto, said shafts being on opposite sides of and arranged symmetrically with respect to a center line of said shear;
    a driven gear on each of said shafts, said driven gears having equal diameters and being spaced one from the other;
    a first pinion gear in direct meshed relationship with one of said driven gears, and a second pinion gear in direct meshed relationship with the other of said driven gears, said first pinion gear having a diameter smaller than the diameter of said driven gears and said second pinion gear having a diameter larger than the diameter of said driven gears, said first and second pinion gears being in an intermeshed relationship at a location spaced laterally from the center line of said shear; and
    drive means for rotatably driving said first pinion gear, said drive means comprising an input shaft, at least one flywheel rotatably mounted on said input shaft, and a clutch mechanism for selectively fixing said flywheel on said input shaft for rotation therewith.

* * * * *